United States Patent
Lauxtermann

(10) Patent No.: US 7,436,342 B2
(45) Date of Patent: Oct. 14, 2008

(54) NUMERICAL FULL WELL CAPACITY EXTENSION FOR PHOTO SENSORS WITH AN INTEGRATION CAPACITOR IN THE READOUT CIRCUIT USING TWO AND FOUR PHASE CHARGE SUBTRACTION

(75) Inventor: Stefan C. Lauxtermann, Camarillo, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 0 days.

(21) Appl. No.: 11/669,061

(22) Filed: Jan. 30, 2007

(65) Prior Publication Data
US 2008/0180112 A1 Jul. 31, 2008

(51) Int. Cl.
*H03M 1/34* (2006.01)
(52) U.S. Cl. ............. 341/164; 341/166; 250/208.1; 250/214 A; 250/214 R
(58) Field of Classification Search ......... 341/164; 250/208.1, 214 R
See application file for complete search history.

(56) References Cited

U.S. PATENT DOCUMENTS

| | | | |
|---|---|---|---|
| 4,956,716 A | 9/1990 | Hewitt et al. | |
| 5,303,027 A * | 4/1994 | Kuderer et al. | 356/328 |
| 5,847,594 A * | 12/1998 | Mizuno | 327/514 |
| 6,121,843 A | 9/2000 | Vampola et al. | |
| 6,157,170 A * | 12/2000 | Noda et al. | 320/132 |
| 6,300,613 B1 * | 10/2001 | Kuderer | 250/208.2 |
| 6,326,603 B1 * | 12/2001 | Kuderer | 250/208.2 |
| 6,455,837 B2 * | 9/2002 | Mizuno | 250/214 R |
| 6,603,109 B2 * | 8/2003 | Pantigny et al. | 250/214 R |
| 6,642,496 B1 | 11/2003 | Gulbransen | |
| 6,642,503 B2 * | 11/2003 | Kummaraguntla et al. | 250/214.1 |
| 6,664,777 B2 * | 12/2003 | Hyakutake et al. | 324/76.17 |
| 6,678,039 B2 * | 1/2004 | Charbon | 356/5.01 |
| 6,919,549 B2 * | 7/2005 | Bamji et al. | 250/208.1 |
| 6,977,601 B1 * | 12/2005 | Fletcher et al. | 341/143 |
| 6,977,682 B2 * | 12/2005 | Mizuno et al. | 348/241 |
| 7,115,925 B2 | 10/2006 | Rhodes | 257/292 |
| 7,138,287 B2 | 11/2006 | Mouli et al. | 438/48 |
| 7,157,685 B2 * | 1/2007 | Bamji et al. | 250/214 A |
| 7,202,463 B1 * | 4/2007 | Cox | 250/214 R |
| 7,244,919 B2 * | 7/2007 | Ishikawa et al. | 250/208.1 |
| 7,326,903 B2 * | 2/2008 | Ackland et al. | 250/208.1 |
| 7,388,413 B1 * | 6/2008 | Ball | 327/131 |

OTHER PUBLICATIONS

"CMOS Minimal Array", Janesick et al., *Proceedings of the SPIE*, Vole. 6295, 62950), 15 pages, 2006, month—not provided.
"Fabrication and Initial Results for a Back-Illuminated Monolithic APS in a Mixed SOI/Bulk CMOS Technology", Bedabrata Pain, Jun. 2005 IEEE Workshop, pp. 102-104, Jun. 2005.

* cited by examiner

*Primary Examiner*—Khai M Nguyen

(57) ABSTRACT

A detector circuit having an integration capacitor coupled to an amplifier via a switch matrix and a comparator coupled to the amplifier, the integration capacitor operable in two or more phases, the switch matrix is configured to phase switch the integration capacitor, the comparator triggers the phase switch when the output voltage of the amplifier passes the threshold voltage of the comparator.

16 Claims, 9 Drawing Sheets

US 7,436,342 B2

NUMERICAL FULL WELL CAPACITY EXTENSION FOR PHOTO SENSORS WITH AN INTEGRATION CAPACITOR IN THE READOUT CIRCUIT USING TWO AND FOUR PHASE CHARGE SUBTRACTION

STATEMENT REGARDING GOVERNMENT RIGHTS

This invention was made with Government support under N66001-02-C-8043 awarded by the U.S. Navy Space & Naval Warfare Systems (SPAWAR) Command. The Government has certain rights in the invention.

BACKGROUND OF THE INVENTION

1. Field of the Invention

The invention relates generally to photo sensors. More particularly, the invention relates to numerical full well capacity extension for photo sensors with an integration capacitor in the readout circuit using two and four phase charge subtraction.

2. Description of Related Art

Ideally, an electronic photo detection system should translate the incoming photon signal into an electronic signal with maximum fidelity, for example, without adding noise, signal distortion or saturation towards high intensities. This ideal situation can only be approximated by any real detection system, and in practice most systems are restricted to specific lighting and/or operating conditions to satisfy this requirement over a limited range. The wider this operating range, the more powerful the sensor system and the less the restrictions that have to be applied to the operating conditions.

Recent advances in photo detection systems focus on digitizing the photon signal at the integration node itself. One prior art approach injects a known amount of charge of opposite polarity into the readout node, as soon as the output signal is getting close to the saturation limit. FIG. 1 illustrates the circuit diagram for this negative charge injection. Charge may be subtracted and the dynamic range may be extended by keeping track of the number of negative charge injections without reducing system sensitivity.

This prior art approach has several disadvantages. First, it can only be applied if the readout node has low impedance, for example, (Capacitor or) Charge Trans-Impedance Amplifier (CTIA) type readout. The approach is not suited for Direct Injection (DI), Buffered Direct Injection (BDI) or floating diffusion type front end circuits with a high impedance integration node. Second, an additional capacitor has to be connected to the input node, which increases the size and noise of the front end circuit. Finally, it requires twice as many charge removal cycles compared to the rotating capacitor approach of this invention, assuming the same total capacitance per unit cell and the same full well capacity.

Another approach, illustrated in FIG. 2, uses a current sink that controls the current flow in the circuit while maintaining low noise characteristics. However, one disadvantage of using the current sink is that it requires a large unit cell in order to achieve low noise performance. Since technology is moving towards smaller photo detection systems, this prior art approach is less favorable.

Full well capacity is the total amount of charge that a conventional image can handle without saturation. The charge on a capacitor may be determined by multiplying the voltage across the capacitor times the capacitor value. A CTIA may be used for infrared and other sensing applications. The CTIA integrates the current generated from a detector over a period of time to provide a measurable output voltage signal. Conventional CTIAs provide high sensitivity amplification of signals from infrared detectors, independent of the detector capacitance.

In photo detection applications with very high backgrounds and/or high signal levels such as long wave infrared imagers, the physically achievable full well capacity of one individual pixel of an imaging array is typically too small to integrate all charge carriers that are generated per 1 frame time. As a result, the integration time for conventional applications is reduced below the frame time in order to avoid saturation.

Numerous prior art methods focus on maximizing the size of the integration capacitor and/or the output voltage swing. However, practical limitations of pixel size, achievable specific capacitance per area and maximum voltage, tolerated by the integrated circuit process, nevertheless make it impossible to capture all of the physically available information with these techniques that scale poorly with process generations. Also, a larger integration capacitor corresponds to lower sensitivity in terms of output voltage swing per photo generated charge carrier. This would reduce the dynamic range towards the low intensity region. As such, the number of detector sites is limited, as is the minimum spacing between detector sites, thereby limiting the achievable image resolution.

In shot noise dominated applications, this limited full well capacity defines the achievable Noise Equivalent Delta Temperature (NEDT). If only a part of the generated signal charge can be integrated, a part of the physically available information would be lost in the detection process.

With an increasing demand for improved detectors, there remains a need in the art for a charge removal process in the readout circuit using numerical full well capacity extension that provides higher full well capacity without sacrificing the size of the unit cell in the imaging array or lowering the light level sensitivity.

SUMMARY OF THE INVENTION

A detector circuit and method for increasing the full well capacity in the detector circuit. The detector circuit having an integration capacitor with a first and a second plate. The integration capacitor is operable in two or more phases. The first plate of the integration capacitor is coupled to a first and a second switch, the first and second switches are configured to phase switch the integration capacitor through the opening and closing of the first and second switches. The second plate of the integration capacitor is coupled to a third and a fourth switch. The third and fourth switches are configured to phase switch the integration capacitor through the opening and closing of the third and fourth switches.

The detector circuit includes an amplifier, a comparator and a counter. The amplifier is coupled to the integration capacitor. The comparator is coupled to the amplifier and the counter. The comparator outputs a signal to the counter when an output voltage of the amplifier is greater than a threshold voltage of the comparator. The counter receives the signal from the comparator and triggers the first, second, third or fourth switches to phase switch.

The method for increasing the full well capacity in a detector circuit using four phase charge subtraction includes, in a first phase, integrating a signal with a first capacitor and sampling the signal with a second capacitor, in a second phase, integrating the signal with the second capacitor and sampling the signal with the first capacitor, in a third phase, reversing the polarity of the first and second capacitors, integrating the signal with the first capacitor, and sampling the signal with the second capacitor, and in a fourth phase, reversing the polarity of the first and second capacitors, integrating the signal with the second capacitor, and sampling the signal with the first capacitor.

Further, the method for increasing the full well capacity in a detector circuit using a multi-phase charge subtraction, includes receiving an electronic signal corresponding to photon energy in a first phase, accumulating charge from the electronic signal in a capacitor, amplifying the electronic signal, comparing the voltage of the electronic signal to a threshold voltage, and triggering a switch matrix to advance to a second phase when the voltage of the electronic signal is greater than the threshold voltage.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION

Figure 3:
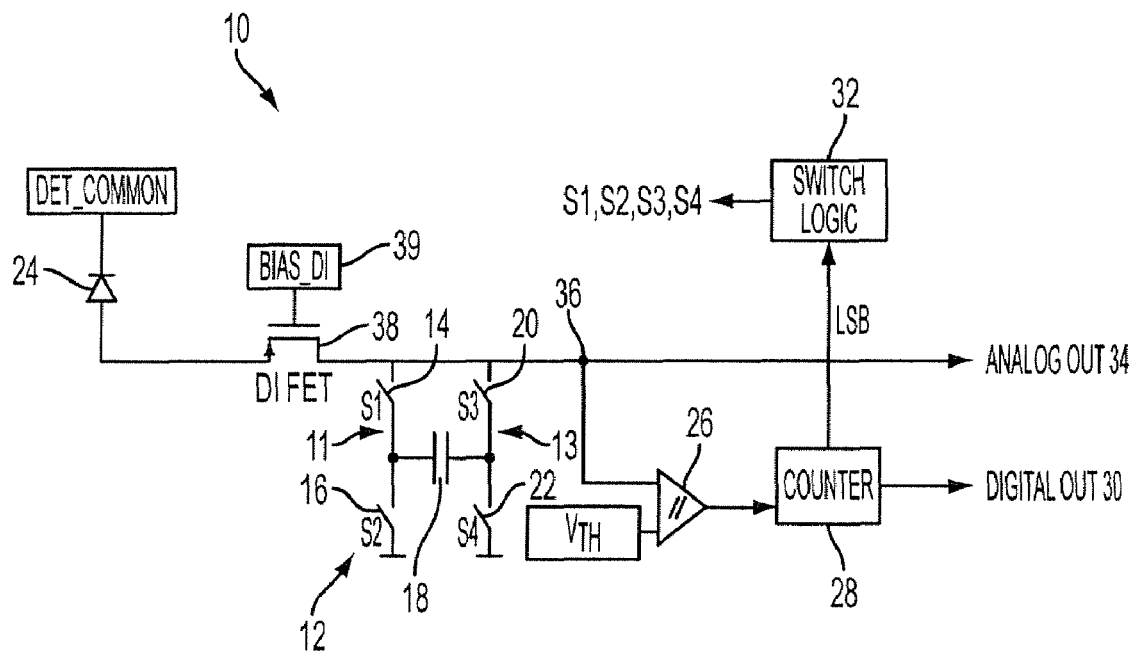
FIG. 3 is a circuit diagram of a unit cell digitizer with DI type front end, according to an embodiment of the invention.

FIG. 3 is a circuit diagram of a unit cell digitizer 10 with Direct Injection (DI) type front end, according to an embodiment of the invention. The unit cell digitizer 10 may include an integration capacitor 18 coupled to a photodiode 24 and a DI FET 38 via a switch matrix 12. The switch matrix 12 has two switches 14 and 16 on one side 11 of the integration capacitor 18 and two switches 20 and 22 on the other side 13.

The DI FET 38 may be either N or P type depending on whether electrons (N type DI transistor) or holes (P type DI transistor) are read out by the unit cell digitizer 10. The DI FET 38 may drain charge from the photodiode 24 by offering a low impedance path onto the integration capacitor 18. The DI FET 38 keeps the voltage on the source constant but allows current to flow off with very low resistance into a high impedance node 36. The bias voltage on the DI FET 38 is Bias_DI 39.

Figure 4:
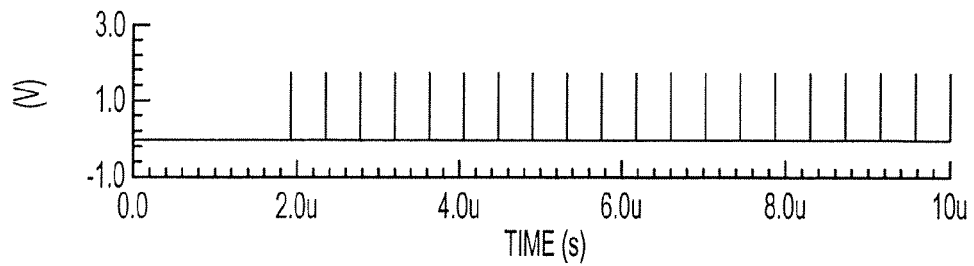
FIG. 4 is an exemplary transient response as the threshold level of the comparator is reached, according to an embodiment of the invention.

The switch matrix 12 may allow electronic "rotation" of the integration capacitor 18, for example, by connecting the output node to the input and vice versa. The electronic capacitor rotation may be triggered by a comparator 26, which can be as simple as a Schmitt trigger. The comparator 26 may trigger the rotation when the integrator output voltage passes a predefined threshold voltage $V_{th}$ close to the saturation level. The comparator 26 may operate asynchronously so that the amount of subtracted charge is the same for every time the threshold level is reached. FIG. 4 illustrates an exemplary transient response as the threshold level of the Schmitt trigger 26 is reached.

Figure 5:
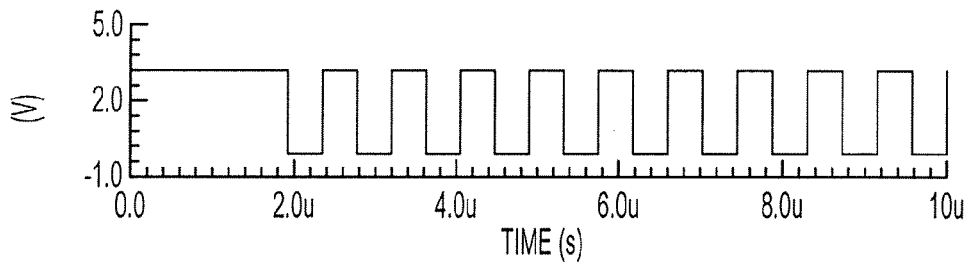
FIG. 5 illustrates exemplary transient voltage signals from the switch logic, according to an embodiment of the invention.

Each rotation triggered by comparator 26 is added to a counter 28 that provides the binary information 30 of the digitization process. The counter 28 may provide a signal in the form, for example, a lowest significant bit (LSB), to switch logic 32 to advance the switch matrix 12 on to the next cycle. FIG. 5 illustrates an exemplary transient voltage signal of the counter's LSB, which is used to advance the state of the switch logic 32. The cycle repeats for as long as the counter 28 does not overflow. At the end of the signal integration, the counter value 30 and the analog residue 34 of the subtraction process are both read out.

Figure 6:
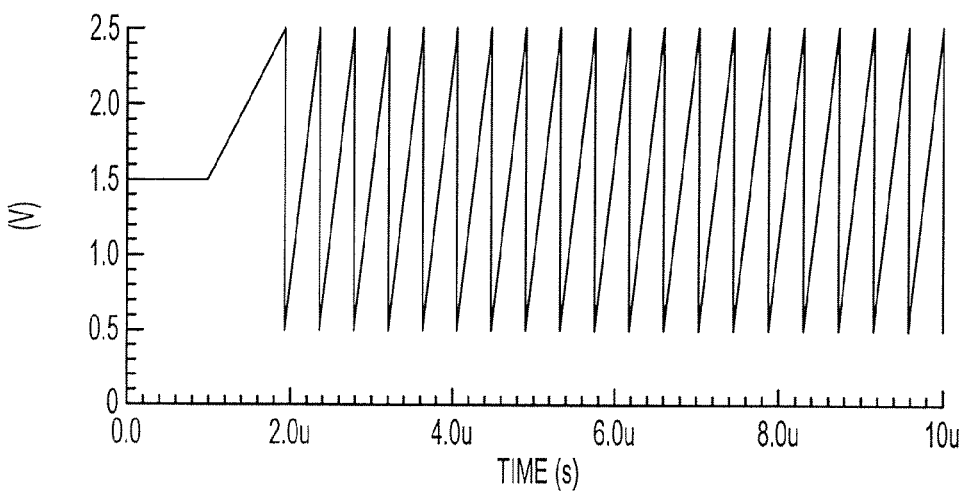
FIG. 6 is an exemplary transient voltage response at the integration node of the DI front end in FIG. 3, according to an embodiment of the invention.

By way of example, in the first state of the switch matrix 12, the integration capacitor 18 may be connected between the integration node 36 and a voltage supply of about 1.5V. At the beginning of a new integration, the integration capacitor 18 is discharged by shorting both capacitor plates to the 1.5 V power supply. The integration begins after this short has been removed. Assuming that the integration slope is positive and the comparator 26 threshold level is about 2.5 V, as soon as a charge corresponding to a voltage increment of about 1 V is accumulated on the integration capacitor 18, the comparator 26 trigger level is reached and a rotation is initiated. While conserving charge on the capacitor 18, the capacitor plate that was previously coupled to integration node 36 is next coupled to the 1.5V power supply. The capacitor plate that was previously connected to the 1.5 V power supply, becomes the integration node 36 for the next cycle. This new state of the switch matrix 12 is equivalent to rotating the integration capacitor 18. Because the charge on the capacitor 18 is conserved during the rotation process, the next integration starts at a voltage level of 0.5 V relative to ground. Different from the very first integration, the next and any further "rotations" are triggered as soon as a charge corresponding to a voltage increment of 2 V on the integration capacitor 18 is accumulated. FIG. 6 illustrates an exemplary waveform on integration node 36 for DI type front end 38.

According to an embodiment of the invention, it is unnecessary to reset the counter 28 or the integration capacitor 18. The integrated charge for any frame is the difference between the values for the present and the previous integration cycles. The total amount of detected signal charge may be determined using the following equation:

$$Q = (N \times C \times 2V) + \left(\frac{V_{residue}}{C}\right) \quad (1)$$

where
Q is the total amount of detected signal charge;
N is the value of counter 28;
C is the capacitance of integration capacitor 18; and
$V_{residue}$ is the analog output voltage on node 34 from the subtraction process.

The sensitivity of the cell digitizer 10 may be defined by the size of the integration capacitor 18. Hence, it may be made independent of the full well capacity of the DI type front end 38, which can be defined by the number of capacitor rotation cycles N. Full well capacity and sensitivity can be optimized independently to the application requirements. While the present invention was described in the context of a P-type DI front end, it can be envisioned by a person skilled in the art that the concept of a 2 phase full well capacitor extension by rotating the integration capacitor 18 can equally be applied to a N-type DI, polarity Buffered DI, or CTIA type front end.

Figure 7:
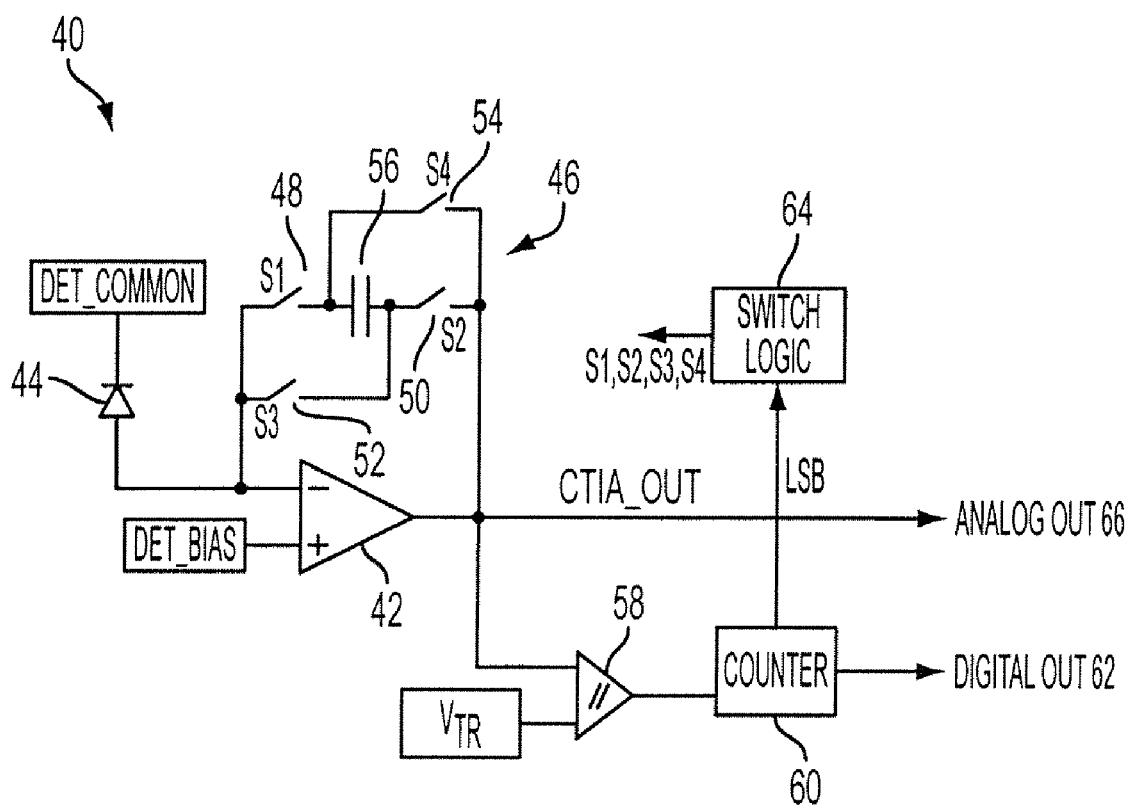
FIG. 7 is a circuit diagram of a unit cell digitizer with CTIA front end using 2-phase capacitor rotation, according to an embodiment of the invention.

FIG. 7 is a circuit diagram of a unit cell digitizer 40 with CTIA type front end 42 using 2-phase capacitor rotation, according to an embodiment of the invention. The unit cell digitizer 40 may include an active integrator coupled to the photodiode 44 via a switch matrix 46. The switch matrix 46 has switches 48, 50, 52 and 54 coupled to the integration capacitor 56.

Figure 8:
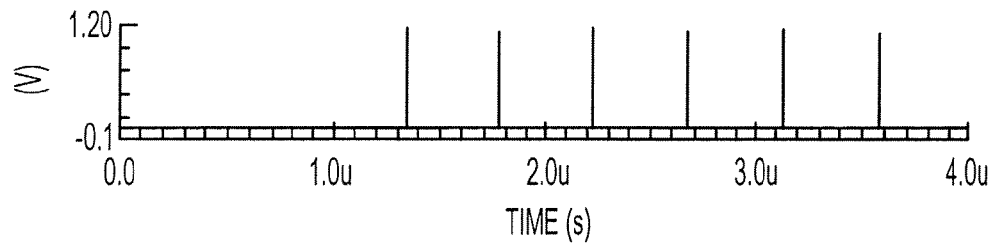
FIG. 8 is an exemplary transient response as the threshold level of the comparator is reached, according to an embodiment of the invention.

The switch matrix 46 may allow electronic "rotation" of the integration capacitor 56, for example, by connecting the output node to the input and vice versa. The electronic capacitor rotation may be triggered by a comparator 58, such as a Schmitt trigger. The comparator 58 triggers the rotation when the integrator output voltage passes a predefined threshold voltage $V_{th}$ close to the saturation level. The comparator 58 may operate asynchronously so that the amount of subtracted charge is the same for every time the threshold level is reached. FIG. 8 illustrates an exemplary transient response as the threshold level of the Schmitt trigger 58 is reached.

Figure 9:
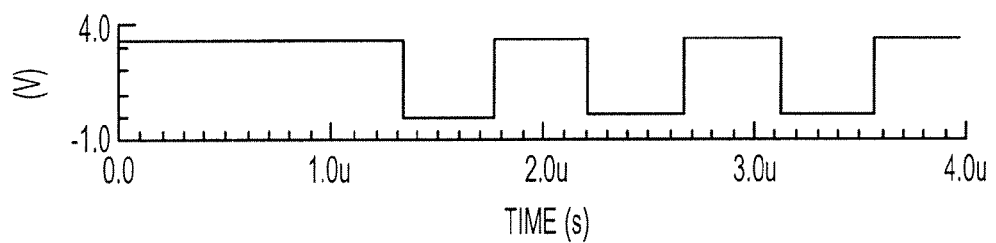
FIG. 9 is exemplary transient voltage signals from the switch logic, according to an embodiment of the invention.
Figure 10:
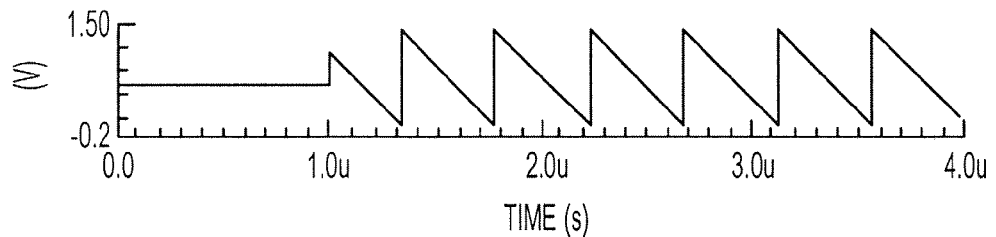
FIG. 10 is an exemplary transient output voltage from the CTIA front end, according to an embodiment of the invention.
Figure 11:
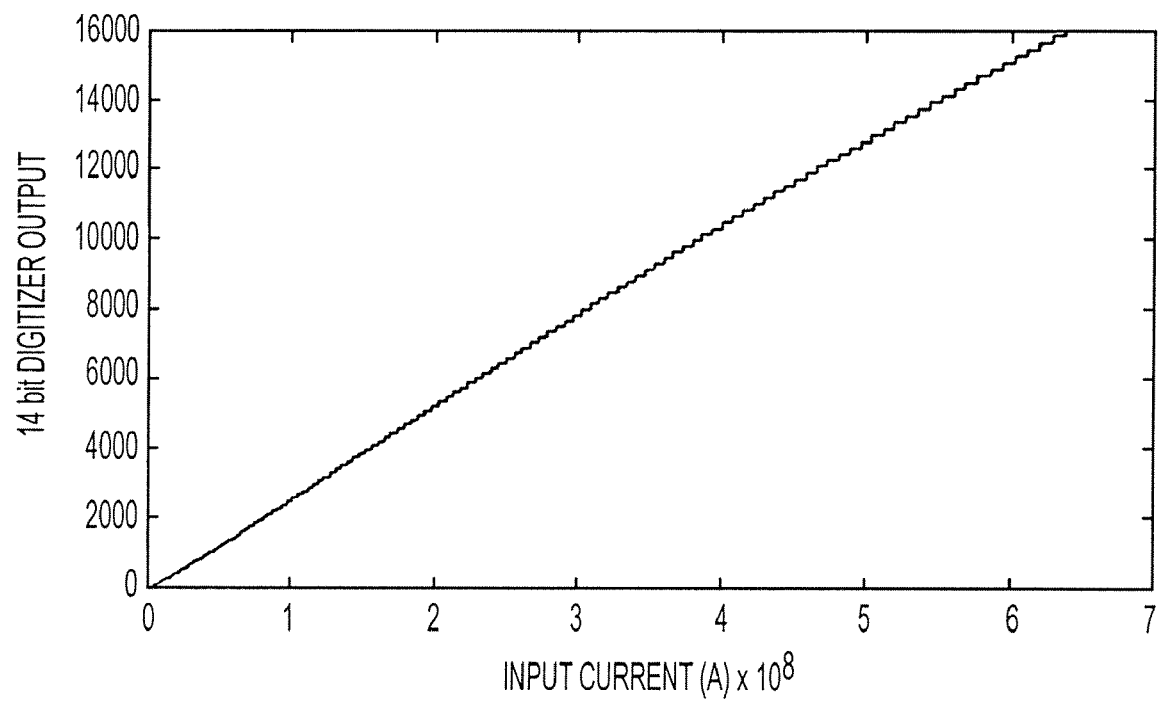
FIG. 11 is an exemplary transfer curve for a CTIA front end digitizer, according to an embodiment of the invention.

Each rotation triggered by comparator 58 is added to a counter 60 that provides the binary information 62 of the digitization process. The counter 60 may signal the switch logic 64 to advance the switch matrix 46 on to the next cycle. FIG. 9 illustrates exemplary transient voltage signals from the switch logic 64 to the switch matrix 46. The cycle repeats for as long as the counter 60 does not overflow. At the end of the signal integration, the counter value 62 and the analog residue 66 of the subtraction process are both read out. FIG. 10 illustrates an exemplary waveform on output node of the CTIA front end 42. FIG. 11 illustrates an exemplary transfer curve for CTIA type front end digitizer.

Figure 1:
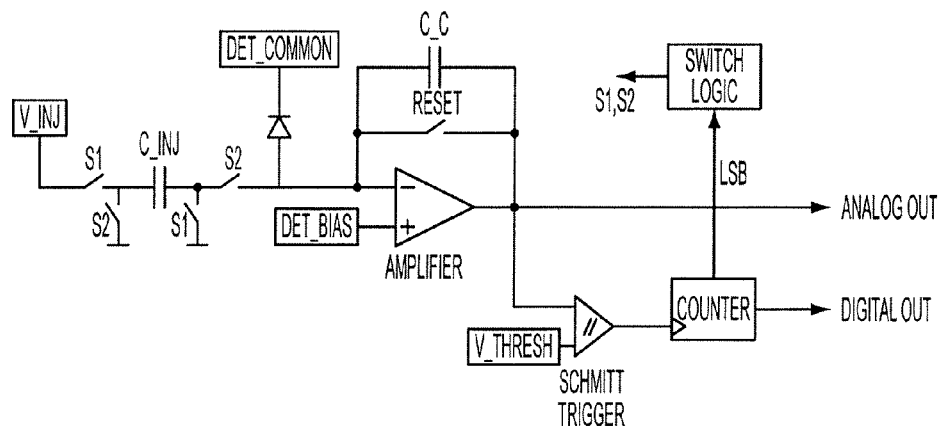
FIG. 1 is a circuit diagram illustrating a prior art negative charge injection in a photo detection system.
Figure 2:
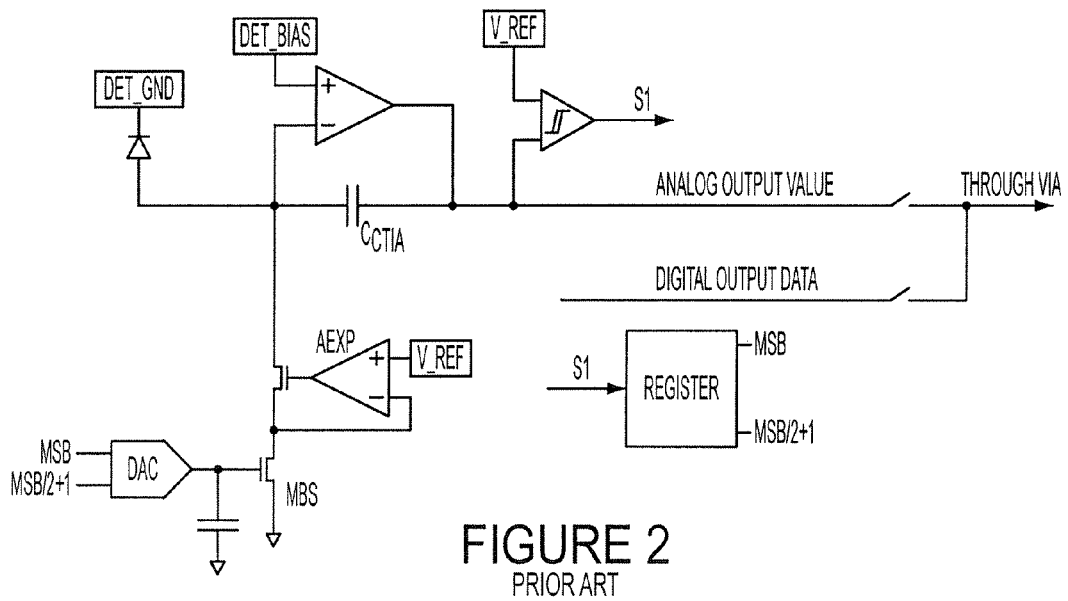
FIG. 2 is a circuit diagram illustrating a prior art photo detection system with current sink.

The embodiments illustrated in FIGS. 3 and 7 have a number of advantages over the prior art. They generate less noise relative to a current subtraction implementation assuming the same unit cell size. Their number of required charge subtraction cycles is less than the prior art negative charge injection approach of FIG. 1, assuming the same unit cell size. They are suited to digitization on high or low impedance integration node. They are equally suited for DI/BD or CTIA front end. Generally, they don't require external clocks and have a full well capacity that is only limited by the depth of the counter.

There are numerous applications for the embodiments illustrated in FIGS. 3 and 7. For example, they may be used for wide dynamic range focal plane arrays with photon shot noise limited performance throughout the entire input range. They may be used for laser jamming resistant imagers or for focal plane arrays used in astronomical applications with very long integration time by providing a very large full well capacity. Furthermore, they may be used for infrared focal plane arrays with a large offset current, for example, because of operation at high temperature. Additionally, they may be used to increase focal plane array yield by bringing high dark current pixels into the useful regime of operability distribution.

Figure 12:
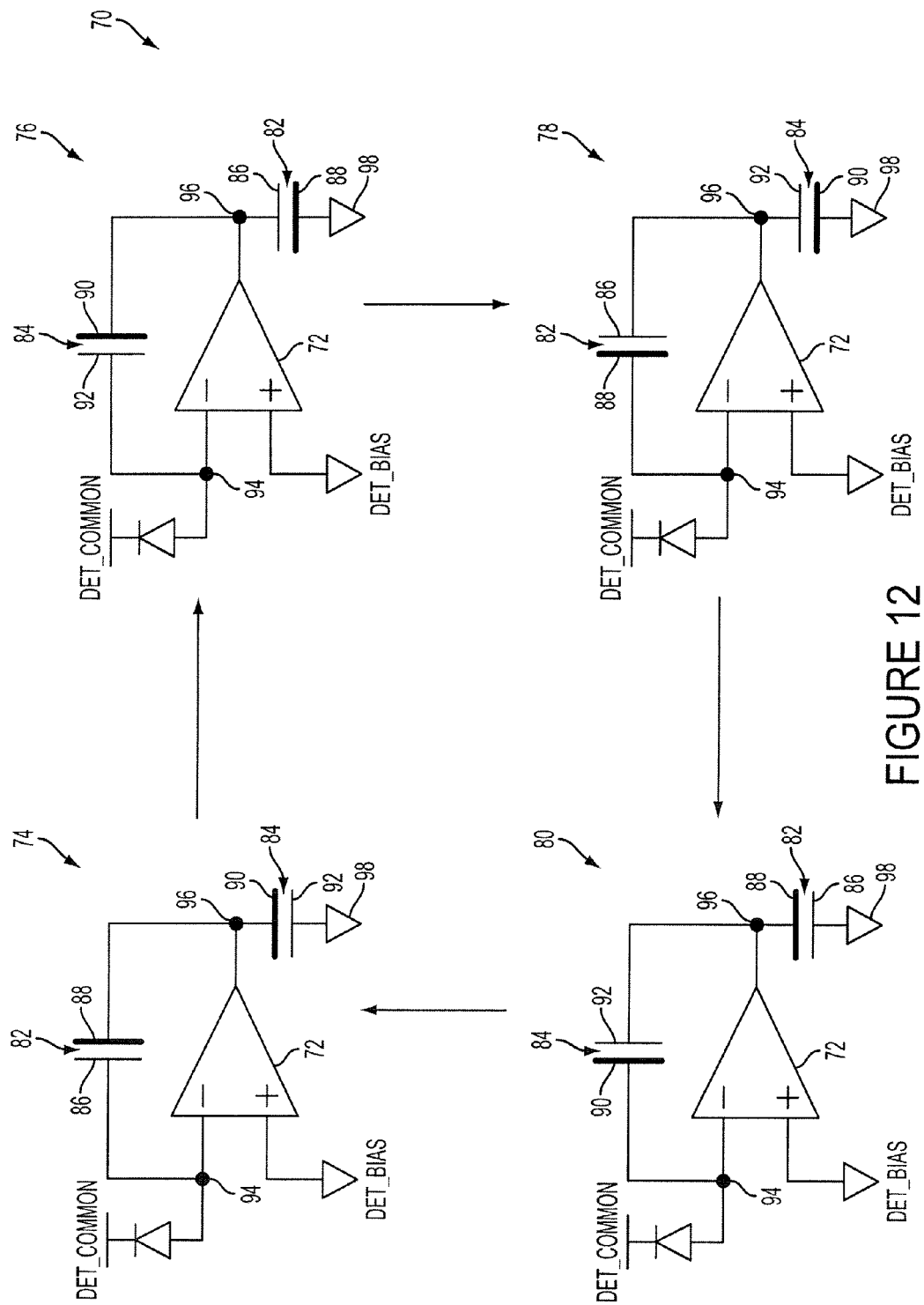
FIG. 12 is a circuit diagram of a numerical full well capacity extension system using 4-phase capacitor rotation, according to an embodiment of the invention.

FIG. 12 is a circuit diagram of a unit cell digitizer 70 with numerical full well capacity extension using 4-phase capacitor rotation, according to an embodiment of the invention. It may be envisioned that each pixel of an active array for a photo sensor (not shown) has the unit cell digitizer 70. The unit cell digitizer 70 is a CTIA readout circuit and includes an operational amplifier 72 with a 4-phase charge subtraction 74, 76, 78 and 80.

Each phase change is dependent on the location of the charge or switch capacitor circuits 82 and 84, and the polarity of their respective plates 86, 88, 90 and 92. One capacitor 82 or 84 may function as a sampling capacitor while the other capacitor 84 or 82 may function as a feedback capacitor of equal value. The capacitors 82 and 84 are sequentially connected to the detector in ("det_in") node 94, the CTIA analog output ("analog_out") node 96, and the capacitor low ("cap_low") node 98. The voltage across the capacitors 82 and 84 may, for example, be 1 Volt. In a switch capacitor circuit 82 or 84, each capacitor plate 86, 88, 90 or 92 may be coupled to a switch matrix (not shown) with three or more switches, but preferably, four switches. The switch matrix may be similar to switch matrix 12 or 46, shown in FIGS. 3 or 7, respectively, but accommodates two additional stages. The switch matrix is used to alter the connections between the nodes 94, 96 or 98, thereby providing the desired phase change. Switching may be achieved by logic to alter the capacitor position and/or polarization.

The CTIA input node voltage is equal to the voltage $V_{det}$. In one embodiment, $V_{det}$ may be assumed to be zero. The CTIA output may be connected to a comparator (not shown) with threshold voltage $V_{th}$. In one embodiment, $V_{th}$ may be assumed equal to an adjustable DC voltage. As soon as the CTIA output voltage $V_{out}$ reaches $V_{th}$ upon charge integration, the comparator is triggered and advances the state of the 4 phase switch matrix by one, thereby advancing the integration cycle to the next cycle.

In the first phase 74, the capacitor 82 is the CTIA integration capacitor and capacitor 84 samples the CTIA output voltage. In the second phase 76, capacitors 82 and 84 are exchanged such that capacitor 84 is the CTIA integration capacitor and capacitor 82 samples the CTIA output voltage. In the third phase 78, capacitor 82 is again the integration capacitor and capacitor 84 is the output sampling capacitor. The polarity of each capacitor is, however, inverted relative to the first phase 74. In the fourth phase 86, capacitor 84 is the CTIA integration capacitor and capacitor 82 samples the CTIA output voltage with the respective opposite polarity relative to the second phase 76.

According to an embodiment of the invention, the four phases 74, 76, 78 and 80 operate in a closed loop system that maintains the phases 74, 76, 78 and 80 in appropriate sequence to cancel out any noise that may otherwise accumulate in the digitizer 70. For example, when the comparator is triggered, the state of the 4 phase switch matrix is advanced by one so that the first phase 74 is switched to the second phase 76. When the comparator is further triggered, the digitizer 70 is switched to the third phase 78 and then switched further to the fourth phase 80. Hence, the sequence of first phase 74 to second phase 76 to third phase 78 to fourth phase 80 is maintained to cancel out any noise accumulation in the digitizer 70.

If the comparator triggers too early/late due to noise in the first phase 74, the integration capacitor 82 may hold too little/much charge when it is disconnected. The same amount of error charge may be stored in capacitor 84. Since capacitor 84 is the integration capacitor in the following integration cycle, the second phase 76, the error charge will add an offset in this phase 76 that will exactly compensate for the error charge from the previous phase 74. If too little/much charge was integrated during the first phase 74, more/less charge has to be integrated during the next cycle until the comparator trigger is reached. Therefore, any noise at the CTIA output node 96 does not accumulate and alter the amount of totally subtracted charge during several integration cycles. Because the amount of totally subtracted charge does not depend on the CTIA output voltage, this process is equally suited for a clocked or non-clocked comparator.

At the end of the first phase 74, $V_{out}$ is equal to $V_{th}$. In one embodiment, the voltage on node 98 can be made equal to $V_{th}$. Hence, there is no charge on capacitor 84. For capacitor 82, the charge is $(V_{det}-V_{th})*C_{int}$, where $C_{int}$ is the capacitance of capacitor 82. The charge for capacitors 82 and 84 carry on to the second phase 76 after switching. If there was an error charge, $V_{error}*C_{int}$, on capacitor 82, there will be an error charge on capacitor 84 of the same value. This error charge will be the offset for the next integration phase 76 with a polarity, such that it will automatically be compensated for in this cycle. The integration continues on in the third phase 78 and the fourth phase 80, with each consecutive phase compensating for any error made in the respective previous cycle.

Figure 13:
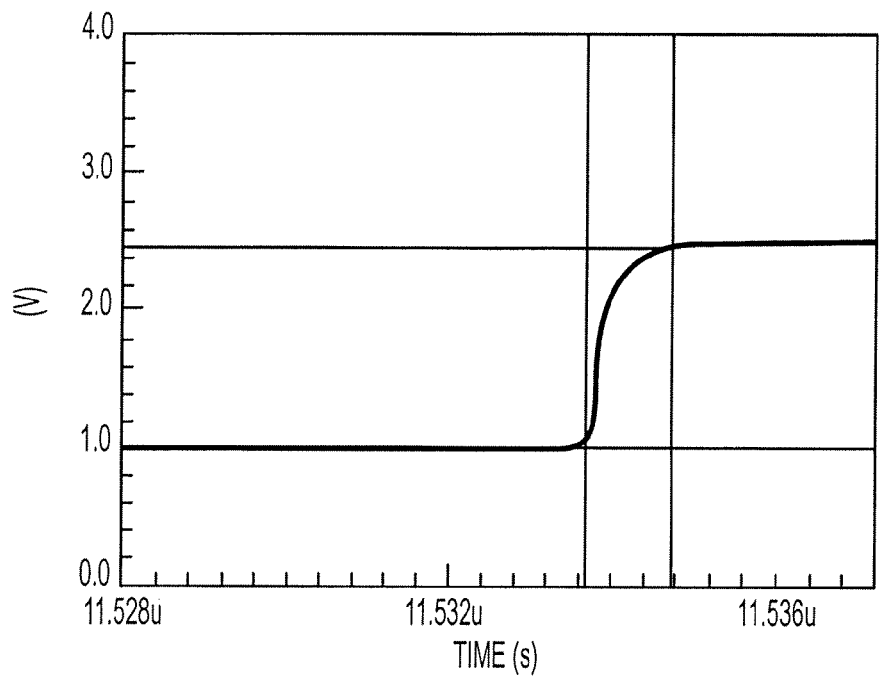
FIG. 13 is an exemplary transient output voltage from the CTIA front end with numerical full well capacity extension, according to an embodiment of the invention.
Figure 14:
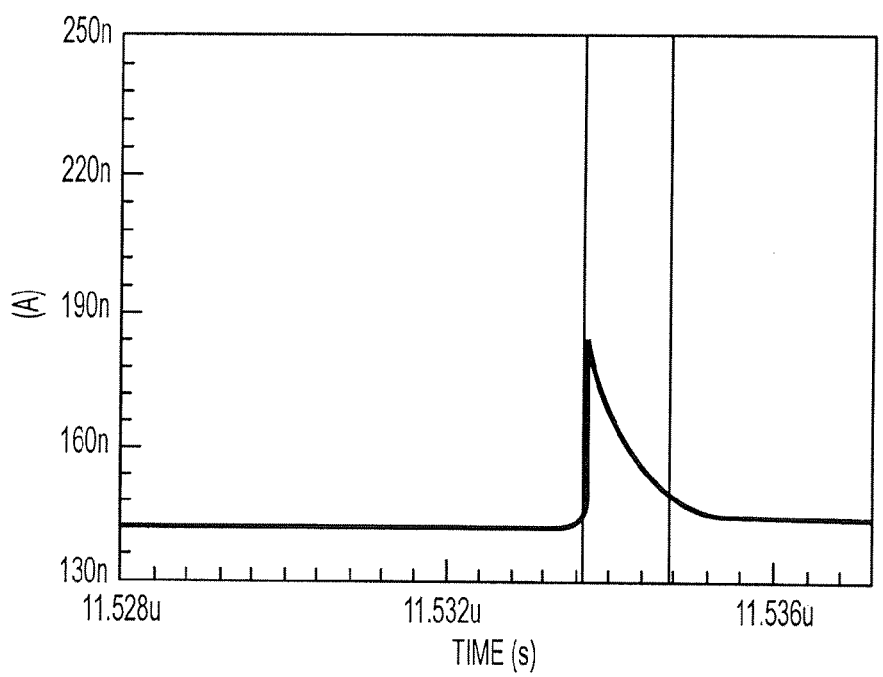
FIG. 14 is an exemplary waveform of CTIA DC current, according to an embodiment of the invention.

Although the CTIA output voltage $V_{out}$ swings by $V_{det}-V_{th}$, no slew current may be necessary during the capacitor switching moment. This characteristic significantly reduces the slew current requirements for the CTIA OPAMP 72 and the power supply wiring requirements inside a 2-dimensional readout array. FIGS. 13 and 14 illustrate an exemplary output voltage swing $V_{out}$ and corresponding slew current $I_{slew}$, respectively. Since there is no charge being transported or removed with phase switching, there is no slew current requirement. FIGS. 13 shows the simulated output voltage swing on node 96 for a capacitor value of 150 fF and the corresponding current in OPAMP 72 in FIG. 14. Within less than 4 nsec the output voltage settles to its final value. While this would require a slew current of $I_{slew}$=150 fF×1.5V/4 nsec=56 µA, the current spike during the phase change is less than 50 nA. This provides a dramatic improvement in terms of peak current requirements.

It is understood by a person skilled in the art that the 4 phase switch matrix need not start with the first phase 74. For example, the 4 phase switch matrix can start with the second phase 76, which is switched to the third phase 78, then switched to the fourth phase 80, and then switched to the first phase 74. Hence, operating in a closed loop system cycles through the four phases 74, 76, 78, and 80 maintains the proper sequence to cancel out any noise accumulation in the digitizer 70. When an image is taken by a photo sensor, the digitizer 70 may be configured to reset the switch matrix. The digitizer 70 may be configured to determine which phase started the closed loop so that the last phase is ascertained.

There are two advantages for the unit cell digitizer 70 with CTIA 72 using 4-phase charge subtraction 74, 76, 78 and 80. First, it removes the noise potentially coming from the comparator. Second, it reduces the slew current requirement of the CTIA 72.

Figure 15:
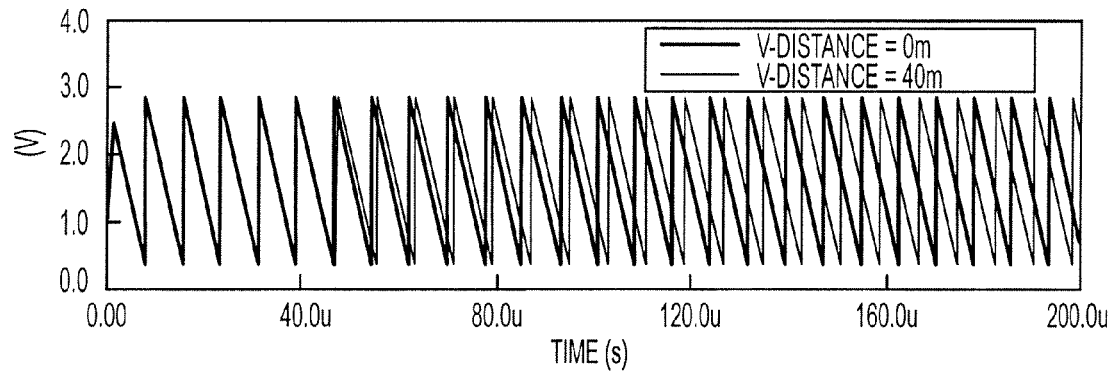
FIG. 15 is an exemplary transient output voltage from the CTIA front end with noise accumulation in a 2 phase capacitor rotation of FIG. 7, according to an embodiment of the invention.
Figure 16:
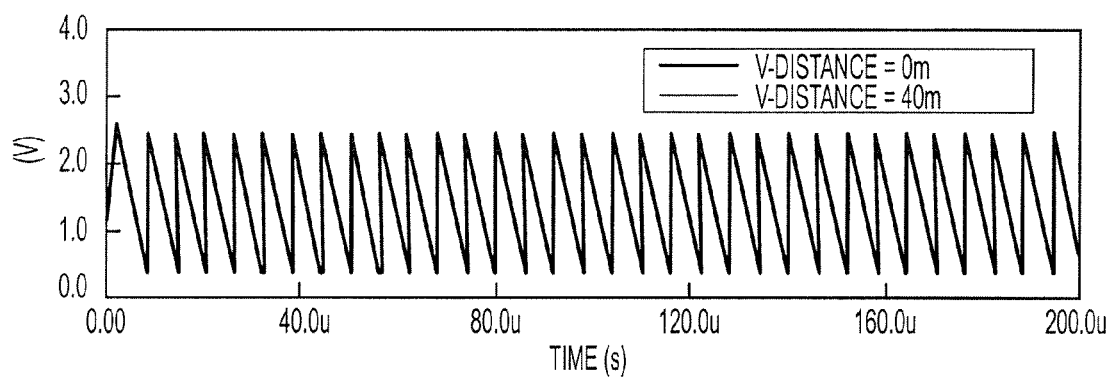
FIG. 16 is an exemplary transient output voltage from the CTIA front end without noise accumulation in a 4 phase capacitor rotation of FIG. 12, according to an embodiment of the invention.

FIG. 15 is an exemplary transient output voltage from the CTIA front end with noise accumulation in a 2-phase capacitor rotation of FIG. 7. FIG. 16 is an exemplary transient output voltage from the CTIA front end with noise accumulation in a 4 phase capacitor rotation of FIG. 12. While the 2-phase capacitor rotation approach for charge removal, shown in FIG. 7, typically has less noise relative to a current subtraction approach, it does not eliminate the noise completely. The noise may accumulate throughout the rotation cycles resulting in an error that shifts the digitization waveform, as shown in FIG. 15. In contrast, the 4-phase capacitor rotation of FIG. 12 eliminates noise accumulation in the system, such that all digital waveforms are identical.

There are numerous applications for the 4-phase charge subtraction approach of the present invention. For example, it may be used to achieve background limited performance ("BLIP") in infrared Focal Plane Arrays (FPAs) with strong backgrounds and therefore with very high full well capacity requirements. For example, a new pixel implementing the 4-phase charge subtraction approach of the present invention may deliver an NEDT performance of about 2 mK, while prior art long wave infrared (LWIR) detectors can only achieve 20 mK in the same pixel size. A new pixel implementing the 4-phase charge subtraction approach of the present invention may have a full well capacity of about $10^{10}$ electrons, while prior art approaches have full well capacity of about $10^7$ electrons, assuming the same pixel size.

Other applications include infinite integration time in astronomy, very wide dynamic range imager with linear response and high sensitivity, and pixel level digitization for industrial imaging that requires high noise immunity. In addition to pixel level digitization, the 4-phase charge subtraction approach may be implemented in a discrete stand alone analog-to-digital converter, especially a sigma delta type converter. A person skilled in the art would understand that the 4-phase subtraction approach may also be implemented in visible imagers, for example, monolithic visible image arrays, hybridized visible image arrays or backside illuminated visible image arrays.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A detector circuit comprising:
   an amplifier;
   a switch matrix;
   an integration capacitor coupled to the amplifier via the switch matrix, the integration capacitor is operable in two or more phases, the switch matrix is configured to phase switch the integration capacitor, wherein the phase switch inverts a polarity of the integration capacitor; and a comparator coupled to the amplifier, the comparator triggers the phase switch when an output voltage of the amplifier passes a threshold voltage of the comparator.

2. The detector circuit of claim 1 wherein the amplifier is a charge trans-impedance amplifier.

3. The detector circuit of claim 1 wherein the switch matrix has two switches on each side of the integration capacitor.

4. The detector circuit of claim 1 wherein the comparator is a Schmitt trigger.

5. The detector circuit of claim 1 further comprising a counter coupled to the comparator, the counter receives a signal from the comparator when the output voltage of the amplifier is greater than the threshold voltage of the comparator, the counter triggers the switch matrix to phase switch.

6. A detector circuit comprising:
a transistor;
a switch matrix;
an integration capacitor coupled to the transistor via the switch matrix, the integration capacitor is operable in two phases, the switch matrix is configured to phase switch the integration capacitor, wherein the phase switch inverts a polarity of the integration capacitor; and
a comparator coupled to the transistor, the comparator triggers the phase switch when an output voltage of the transistor passes a threshold voltage of the comparator.

7. The detector circuit of claim 6 wherein the transistor is a direct injection field effect transistor.

8. The detector circuit of claim 6 wherein the switch matrix has two switches on each side of the integration capacitor.

9. The detector circuit of claim 6 wherein the comparator is a Schmitt trigger.

10. The detector circuit of claim 6 further comprising a counter coupled to the comparator, the counter receives a signal from the comparator when the output voltage of the transistor passes the threshold voltage of the comparator, the counter triggers the switch matrix to phase switch.

11. A detector circuit comprising:
an integration capacitor having a first and a second plate, the integration capacitor is operable in two or more phases;
a first and a second switch connected to the first plate of the integration capacitor, the first and second switches are configured to phase switch the integration capacitor through the opening and closing of the first and second switches;
a third and a fourth switch connected to the second plate of the integration capacitor, the third and fourth switches are configured to phase switch the integration capacitor through the opening and closing of the third and fourth switches;

an amplifier coupled to the integration capacitor; and
a comparator coupled to the amplifier and a counter, the comparator outputs a signal to the counter when an output voltage of the amplifier passes a threshold voltage of the comparator, the counter receives the signal from the comparator and triggers the first, second, third or fourth switches to phase switch.

12. The detector circuit of claim 11 wherein the amplifier is a charge trans-impedance amplifier.

13. The detector circuit of claim 11 wherein the comparator is a Schmitt trigger.

14. The detector circuit of claim 11 wherein the phase switch inverts the polarity of the integration capacitor.

15. A method for reducing noise in a detector circuit, the detector circuit includes a photodiode, an amplifier, a first capacitor coupled to the amplifier via a first switch matrix, and a second capacitor coupled to the amplifier via a second switch matrix, the first and second capacitors are operable in a four phase charge subtraction, the method comprising:
in a first phase, integrating a signal with the first capacitor and sampling the signal with the second capacitor;
in a second phase, integrating the signal with the second capacitor and sampling the signal with the first capacitor;
in a third phase, reversing the polarity of the first and second capacitors, integrating the signal with the first capacitor, and sampling the signal with the second capacitor; and
in a fourth phase, reversing the polarity of the first and second capacitors, integrating the signal with the second capacitor, and sampling the signal with the first capacitor.

16. A method for reducing noise in a detector circuit, the detector circuit includes a photodiode, an amplifier and a capacitor coupled to the amplifier via a switch matrix, the capacitor is operable in a multi-phase charge subtraction, the method comprising:
receiving an electronic signal corresponding to photon energy in a first phase;
accumulating charge from the electronic signal in the capacitor;
amplifying the electronic signal;
comparing the voltage of the electronic signal to a threshold voltage;
triggering the switch matrix to advance to a second phase when the voltage of the electronic signal passes the threshold voltage; and
reversing a polarity of the capacitor in the second phase using the switch matrix.

* * * * *